Patented Mar. 16, 1926.

1,577,171

UNITED STATES PATENT OFFICE.

ROY H. BROWNLEE AND ROY H. UHLINGER, OF PITTSBURGH, PENNSYLVANIA, ASSIGNORS, BY MESNE ASSIGNMENTS, TO CARBO-OXYGEN COMPANY, OF PITTSBURGH, PENNSYLVANIA, A CORPORATION OF DELAWARE.

PROCESS OF METAL CUTTING, WELDING, OR THE LIKE.

Original application filed June 1, 1915, Serial No. 31,441. Divided and this application filed August 13, 1925. Serial No. 49,958.

*To all whom it may concern:*

Be it known that we, Roy H. Brownlee and Roy H. Uhlinger, citizens of the United States, residing at 223 Fourth Avenue, Pittsburgh, in the county of Allegheny and State of Pennsylvania, have invented certain new and useful Improvements in Processes of Metal Cutting, Welding, or the like, of which the following is a specification.

Our invention relates to an improvement in a process of metal cutting, welding or the like using a gas containing hydrogen and carbon compounds, and this application is a division of application Serial No. 31,441, filed June 1, 1915.

The gas used is especially suitable with oxygen as a combustion jet, for lead burning, brazing of brass and aluminum, the cutting and welding of iron and steel, and like operations requiring a high combustion. However, it is not restricted in its usefulness to these particular purposes, but may be applied in any case where a highly combustible gaseous heating fuel is used. The objects of the invention are to produce an economical, efficient, safe and practical process or flame for lead burning, brazing and the welding and cutting of iron and steel or other metals.

A gas especially suitable for the above purposes, consists of materials associated in approximately the following proportions: hydrogen eighty-seven (87%) per cent, hydrocarbon nine (9%) per cent, and carbon monoxide four (4%) per cent. The constituents of gas may vary, however, between certain limits. For example, the percentage of hydrogen and hydrocarbon in the case or paraffin hydrocarbons may vary depending upon the nature of the hydrocarbon used and the work for which the composition is required.

Also, the proportion of carbon monoxide may vary between certain limits. When ethylene and acetylene hydrocarbons are used, their proportion may be greatly increased over the amount of paraffin hydrocarbons. This will be readily understood when it is explained that for uses to which we desire to put this gas, it is essential that the gas employed must have a very high rate of combustion. For example, methane, having an extremely low rate of combustion, can be employed in amounts up to twelve or fifteen (12% or 15%) per cent, whereas when hydrocarbons of the ethylene and acetylene series are employed considerably larger proportions may be used owing to their higher rate of combustion.

This gas may be prepared in a single operation or it may be made by mixing of its separate constituents. The usual method of producing this gas is as follows, reference being had to the accompanying drawings, showing in section, forms of apparatus adapted to the process, in which—

Fig. 3 is a detail view in vertical section showing a further modification.

Figure 1:
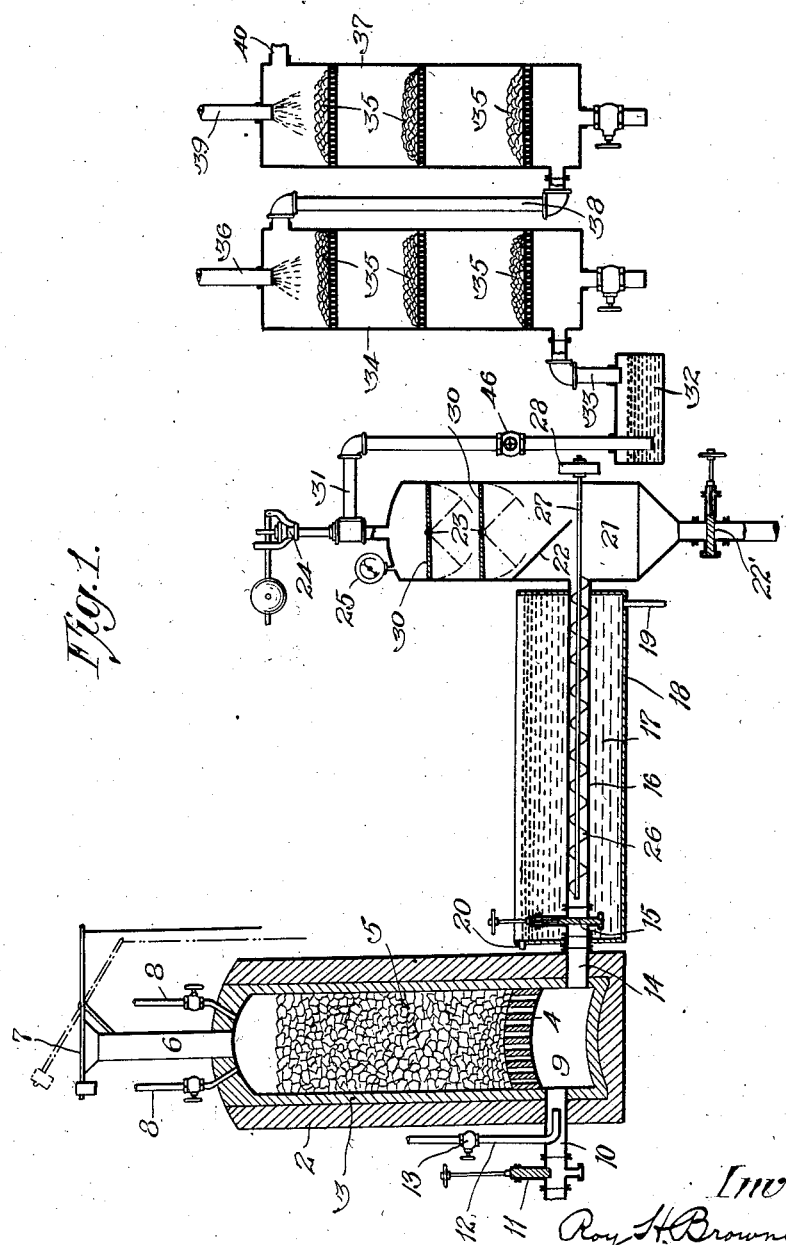
Fig. 1 shows in sectional elevation an apparatus adapted to carry out the process for producing the gas.

A vertical gas-tight generator or chamber 2 is constructed to withstand the pressure of several atmospheres, preferably provided with highly refractive linings 3 of suitable fire brick, and near the bottom is a supporting checker-work 4 of similar material.

A filling of irregular pieces of refractory material 5 is contained within the body of the generator, above the supporting checker-work, or the entire inner part of the generator may be built up of checker-work of suitable refractory brick.

At the top of the generator is a stack 6 provided with a suitable damper valve 7 for closing the stack and generator so as to be gas-tight.

Inlet pipes 8 for supplying hydrocarbon, such as natural gas, are introduced through the upper portion of the generator. A damper controlled air conduit 10 having a damper or valve 11 and a gas pipe 12 having a controlling valve 13, are introduced to chamber 9 below the checker-work or refractory material 5 for heating the generator and its contents.

Leading outwardly from the base of the generator 2, at any suitable location, is a conduit 14 provided with an opening and closing valve or damper 15 for controlling the circulation, beyond which the conduit is connected with the tubular conveyor 16. Said conveyor extends through a cooling bath 17 of water within a surrounding enclosing tank or casing 18, provided with a supply connection 19 and an overflow 20.

The other end of the conveying conduit 16 leads to a receiving hopper 21, provided with an outlet controlling valve 22' at its lower portion for removal of carbon. At the upper end of this hopper is a screen box portion, between which and the lower portion of the hopper preferably extends a sloping partition or shield 22.

The conduit 16 is provided with a rotatable screw conveyor 26, actuated by shaft 27 driven by any suitable gearing, as a pulley or sprocket wheel 28, whereby to propel the precipitated carbon through the conduit. The upper screen box portion of the hopper is provided with fine screens 30 of cloth or other filtering medium of a suitable nature to filter out the carbon carried along with the gas. These screens are preferably mounted adjustably within the casing, as by hinged mountings 23, and are adapted to be raised to horizontal operative position, as shown, or to be lowered, as indicated in dotted lines, whereby, by a suitable lever mechanism on the outside of the casing, any collected carbon may be dropped into the hopper below. The outlet at the upper portion of the casing is provided with a suitable safety valve 24 and a pressure indicating gauge 25.

Beyond the screens is a conduit 31 leading to a water seal vessel 32, in which the terminal of the conduit is submerged and conduit 33 leads from the upper portion of water seal vessel 32 to a scrubber 34 of any suitable construction, provided with porous material 35 and a water spray 36, whereby the gases are further cooled and washed.

An additional scrubber 37 may also be provided, connected with the primary scrubber 34 by a circulation pipe 38, into which additional scrubber a spray pipe 39 of lime water or other alkaline material may be introduced, by which impurities in the gas are removed, such as traces of sulfur compounds in the gas or other hydrocarbon used. The gas passes off by outlet pipe 40 to any suitable collecting or storage tank.

At any suitable point beyond the carbon separator or screen box 21 is the automatically regulated pressure relief valve 46 for holding the desired pressure in the generator and carbon separator. Such valve is preferably situated between the carbon separator and the water seal 32, but may also be inserted in the line beyond the scrubbers, if preferred, for the same purpose.

It will also be understood that the pressure in the generator 2 may be regulated by valve 15 or valve 46, or lower pressures, as a few ounces above atmospheric pressure may be regulated by the depth of the end of the conduit 31 in the water seal 32.

The operation of making the gas, utilizing the above described apparatus, having reference to the apparatus of Fig. 1, is as follows:

With the valve 7 in stack 6 opened, and valve 15 to the carbon precipitating conduit 16 closed, gas (natural gas, coal gas, oil vapor or other hydrocarbon, preferably as a gas, liquid or volatilizable solid) is admitted through pipe 12 with a suitable amount of air by conduit 10 to chamber 9 below the checker-work for the complete combustion of the fuel.

The products of combustion pass upwardly through the interior of generator 2 and its refractory contents 5, the operation being continued until the generator and its contents are heated to a very high temperature, that is, above the temperature at which part of the hydrocarbons to be used in the formation of this composition are decomposed.

When a suitable temperature has thus been reached, say 1200 degrees C. or higher, the air supply 10 by valve 11 and then the gas supply 12 by valve 13 is shut off, the stack valve 7 is closed, and valve 15 to the carbon precipitator is opened. Then the valves in the pipe or pipes 8 at the top of the generator are opened, and gas or other hydrocarbon, with or without a regulated small amount of water vapor, is introduced at the top of the generator, and if used, the small amount of water vapor required being determined by the amount of carbon monoxide desired in the gas. The small amount of carbon monoxide desirably present in the gas, even though no water vapor is directly added, is derived from the slight traces of moisture usually present in the hydrocarbon used, and also from the slight reduction of oxides in the refractory material.

The hydrocarbon and moisture passing downwardly in contact with the very highly heated surfaces of refractory material 5, and in the absence of air, is decomposed to form the gas and carbon black.

These elements pass outwardly from the base of the generator through conduit 14, entering the conveying conduit 16, being carried therethrough by conveyor 26 through the cooling water bath 17, effecting precipitation of the carbon, which is discharged by the conveyor into hopper 21, or washed away by water (Fig. 3).

The gas passing through the automatic pressure regulating valve 46, the water seal tank 32, and the washing tanks 34 and 37, and finally to a holder, is thus completely cleansed of any suspended impurities.

The operation above described is continued until the temperature in the generator 2 has been reduced to a degree below which a satisfactory reaction does not occur, whereupon the supply of hydrocarbon gas through pipe 8 is shut off at the top of the generator, after pressure in the furnace is reduced to atmospheric pressure by opening the regulating valve 46.

Valve 15 to the precipitator conduit 16 is then closed, stack valve 7 is opened, and gas and air are again admitted from connections 12 and 10 for additional combustion and heating of the refractory contents of the generator, preparatory to a repetition of the operation just described.

In case a liquid or volatilizable solid is used as a fuel at the base of the generator, it may be sprayed or blown into the combustion chamber 9 with an air blast. When the same kind of hydrocarbon is used at the top of the generator, as in Fig. 2, instead of gas, for the making of this composition and carbon black, it may also be sprayed in under pressure, or atomized by aid of compressed hydrogen without air, so that only minute particles of the gas will strike the hot checker-work, by using a suitable atomizer.

Otherwise the entire checker-work would soon be clogged with carbon, whereas, when either a gas or very fine spray is used, the finely divided carbon is carried down with the gas.

In case a higher proportion of hydrocarbon is desired the natural gas employed or other hydrocarbon used is passed through the generator more rapidly than when only a small amount of hydrocarbon is desired, or the generator may be run at a low temperature, so that only a part of the hydrocarbon is decomposed to form hydrogen and carbon black, and the remainder is carried through the generator, mixed with the hydrogen as a fixed gaseous hydrocarbon, which remains mixed and may be employed in the usual operations previously described.

Figure 2:
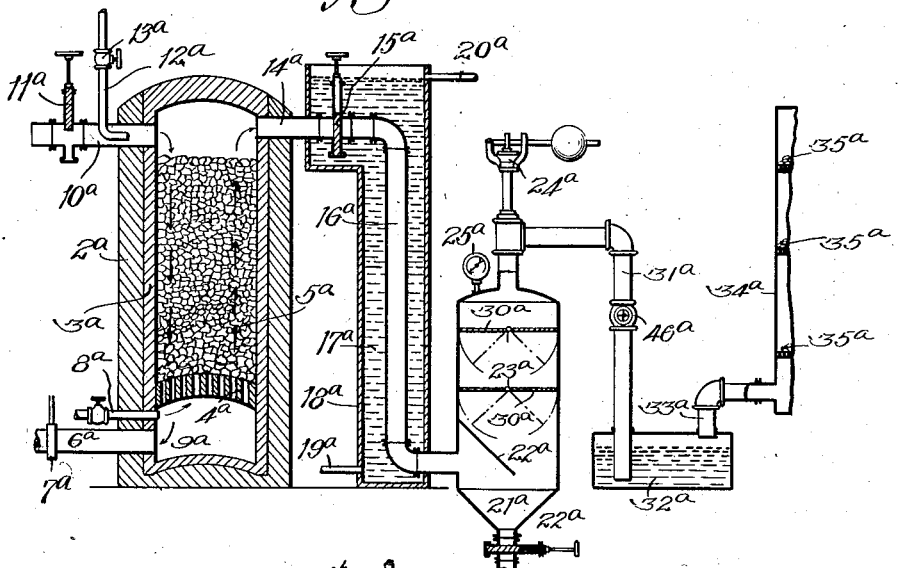
Fig. 2 is a view similar to Fig. 1 showing a modified arrangement.
Figure 5:
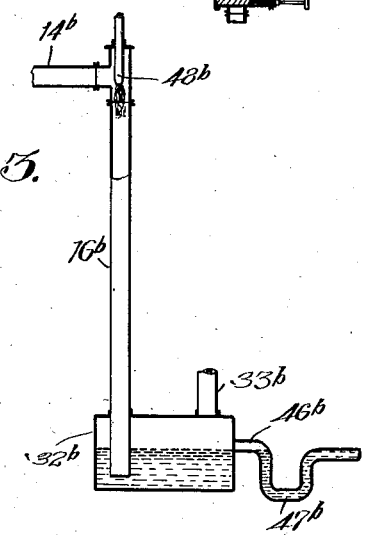

Fig. 2 shows a modified arrangement of the generator $2^a$, whereby the products of combustion for heating the refractory material $5^a$ lead downwardly from the top to a suitable outlet $6^a$, gas being furnished at the top by pipe $12^a$ having a valve $13^a$, and air by pipe $10^a$ having a valve $11^a$.

The gas to be decomposed in such case enters through the base of the generator by pipe $8^a$, passing upwardly through the checker-work or refractory material $5^a$, and outwardly at the top through conduit $14^a$.

Conduit $14^a$ is likewise provided with a controlling valve $15^a$, and a conduit $16^a$ extends vertically down within and through a body of water $17^a$ in casing $18^a$ provided with a supply connection $19^a$ and an overflow $20^a$.

The lower end of the conduit $16^a$ opens into a hopper $21^a$ of the same construction as above described, adapted to collect the carbon, the gas passing off in the same manner and through the same apparatus similarly indicated by numerals having the exponent "a." This arrangement and the operation carried out with the apparatus of Fig. 2 is desirable, as this procedure of passing the hydrocarbon upwardly under pressure decreases the amount of carbon which is carried over into the conveying conduit, and leaves more in the checker-work, where it is burned during the succeeding heating periods.

In Fig. 3, we show in detail a modified arrangement in which the gas from the generator 2 or $2^a$ is conducted by conduits $14^b$ and $16^b$ to a water seal vessel $32^b$, into which the carbon is discharged, the gas passing off by conduit $33^b$ to a holder or other apparatus.

In such case an overflow pipe $46^b$ leads off at the desired water level, having a gooseneck section $47^b$ providing a water seal, and leading to any suitable point of discharge.

A spray pipe $48^b$ is introduced at the upper end of conduit $16^b$, as shown, whereby to furnish ample water supply and assist in precipitation of the carbon.

If desired, conduit $16^b$ may be surrounded by a water jacket similar to jacket $18^a$, whereby to protect conduit $16^b$ and cool the gas and carbon in circulation.

The gas may be made as explained above so as to produce a gas containing only a very small proportion of hydrocarbon and the hydrocarbons of the ethylene acetylene or paraffin series may be added from a separate source, of these different constituents may of course be added to pure hydrogen, as indicated above.

The gas is used in the process of metal cutting or welding, which process consists in mixing with oxygen the gas, and applying the flame of combustion of the oxygen-gas mixture to the metal.

There are a number of advantages in the use of a large proportion of hydrogen in the mixture, with small proportions of hydrocarbon and carbon monoxide. Thus, in using a large proportion of hydrogen (substantially 75% or over of the mixture), this provides a highly combustible base, whereby the rate of combustion is high in order that the gas can burn with a needle flame of relatively great length if desired, which is not possible with water gas or the like wherein the rate of combustion is relatively low due to the presence of a large amount of hydrocarbon and carbon monoxide and a relatively small proportion of hydrogen, contra-distinguished from the present gas. By using the hydrocarbon in small proportion, this gives the gas a high heating value in the presence of oxygen, and just sufficient carbon monoxide is used according to the work to be done to avoid oxidation of the metal worked on in case of welding. The amount of hydrocarbon is small in proportion and percentage of the gas according to the grade of hydrocarbon used, so as not to slow up in effect the high rate of combustion. Thus, the amount of hydrocarbon will be substantially 5% or over of the mixture and will vary with different grades of hydrocarbons, and it is important that, as described hereinbefore, the proportion of the particular hydrocarbon be regulated according to the grade of the hydrocarbon and the large proportion of hydrogen, so that the desired results are obtained. If an extremely small or negligible amount of hydrocarbon is used, then the desired results are not present, just the same as if pure hydrogen were used, whereas if a larger amount of hydro-carbon is used as in coal gas or natural gas, this slows up the rate of combustion, so that the gas is not effective for metal cutting, welding and other heating purposes. There is, therefore, a relation established between the small proportion of hydrocarbon according to the grade thereof, and the large proportion of hydrogen. The use of carbon monoxide is of advantage, when it is used in a small amount (less than 10% of the mixture), the amount being sufficient according to the work to be done for preventing oxidation of the metal, and being small in proportion to the hydrogen and percentage of the gas, so as not to materially cut down the heat produced. Otherwise, the advantages sought for are lost. The hydrogen, hydrocarbon and carbon monoxide can be mixed, but the process has its advantage due to the homogeneous mixture of partially decomposed and partially nondecomposed hydrocarbon of suitable grade, the decomposed hydrocarbon being freed of its carbon. Thus, the hydrogen and small percentage of hydrocarbon are obtained from a single source and are mixed during partial decomposition, and it has been found that this mixture when freed of carbon, is very successful in practical use, and may be preferred, in many instances, to mixing pure hydrogen with a hydrocarbon and carbon monoxide.

Having thus described the invention, what is claimed as new is:—

1. The process of metal cutting or welding consisting in mixing with oxygen a gas including substantially 75% or over of hydrogen and substantially 5% or over of hydro-carbon, and applying the flame of combustion of the oxygen-gas mixture to the metal.

2. The process of metal cutting or welding consisting in mixing with oxygen a gas including substantially 75% or over of hydrogen, substantially 5% or over of hydrocarbon and not over 10% of carbon monoxide, and applying the flame of combustion of the oxygen-gas mixture to the metal.

3. The process of metal cutting or welding consisting in mixing with oxygen a gas the major portion of which consists of hydrogen with a minor proportion of hydrocarbon, and applying the flame of combustion of the oxygen-gas mixture to the metal.

4. A metal cutting or welding flame comprising the mixture with oxygen of a gas including substantially 75% or over of hydrogen and substantially 5% or over of hydro-carbon.

5. A metal cutting or welding flame comprising the mixture with oxygen of a gas including substantially 75% or over of hydrogen, substantially 5% or over of hydrocarbon and not over 10% of carbon monoxide.

6. A metal cutting or welding flame comprising the mixture with oxygen of a gas the major portion of which consists of hydrogen with a minor proportion of hydrocarbon.

In testimony whereof we hereunto affix our signatures.

ROY H. BROWNLEE.
ROY H. UHLINGER.